May 14, 1929.  R. K. JACK  1,713,231
PISTON
Filed Jan. 28, 1926
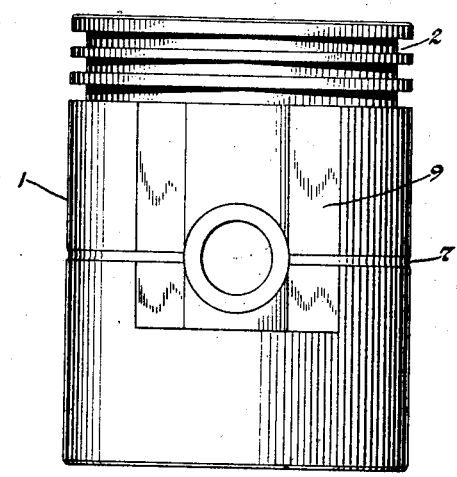
Fig.1
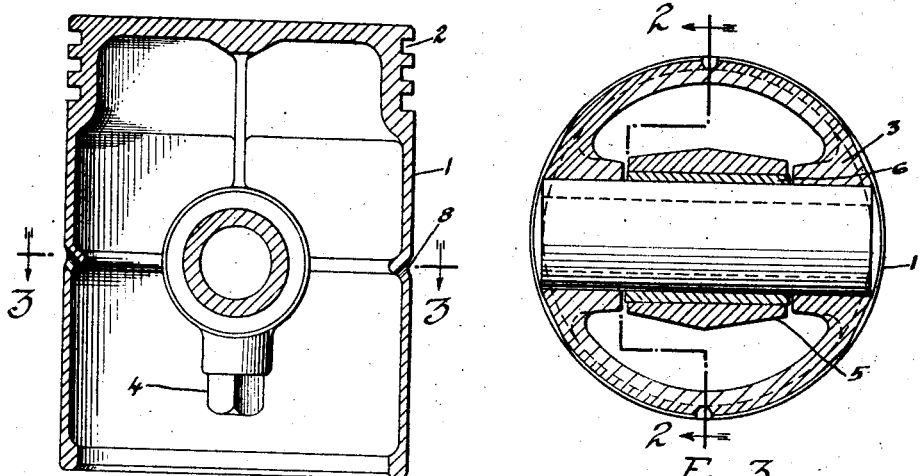
Fig.2
Fig.3
Inventor
Robert K. Jack
By Blackmore, Spencer & Flint
Attorneys Patented May 14, 1929.

1,713,231

UNITED STATES PATENT OFFICE.

ROBERT K. JACK, OF LANSING, MICHIGAN, ASSIGNOR TO GENERAL MOTORS CORPORATION, OF DETROIT, MICHIGAN, A CORPORATION OF DELAWARE.

PISTON.

Application filed January 28, 1926. Serial No. 84,348.

This invention relates to pistons and while useful in other relations is particularly intended for pistons used in internal combustion engines.

As is well known, it is necessary to lubricate the walls of such pistons, and also to prevent excess oil from passing the rings, entering the combustion chamber and fouling the plugs.

An object of this invention is to afford means for lubricating the skirt portion of the piston walls and the wrist pin bearings and to so modify the usual piston that excess oil is returned to the crank case.

The invention is embodied in the structure shown in the accompanying drawing and herein described.

In the drawing:

Figure 1 is a side view of the piston. Figure 2 is a section on line 2—2, Figure 3, and Figure 3 is a section on line 3—3, Figure 2.

Referring particularly to the drawings, numeral 1 represents the piston in its entirety. This piston is provided with the usual ring grooves 2, three of these grooves being shown in the drawing. The piston is hollowed out, and inwardly directed portions 3 are provided for the reception of the wrist pin. This wrist pin is secured in position in the piston by a screw bolt as shown at 4. Figure 3 shows a small end of the connecting rod at 5 provided with a bushing at 6.

Extending circumferentially about the outer wall of the piston is a shallow groove 7. This groove is preferably positioned along the wall of the piston at a point corresponding to the longitudinally axis of the wrist pin. At diametrically opposite points the groove 7 connects with the interior part of the piston by means of openings 8 drilled at an angle through the wall of the piston. Two clearance spaces are provided as at 9 in Figure 1 extending from the vicinity of the wrist pin to the lower ring groove. These clearance spaces are located one on each side of the piston as will be obvious.

It will be understood that oil drawn up and collecting on the inside wall of the cylinder is gathered in the groove 7. It will also be clear that oil scraped from the inner wall by the piston rings may pass through the clearance space 9 to the end of the wrist pin and to the groove 7. The oil in groove 7 will serve to lubricate the skirt portion of the piston and also the wrist pin bearings. Should there be excess oil collected in the groove 7 the apertures 8 provide a relief through which the excess may pass within the piston and thence to the crank case. The construction thus aims to secure perfect lubrication for the skirt of the piston, for the wrist pin bearing, to prevent lubricating oil entering the combustion chamber and to afford relief for any excess oil that may accumulate along the inner walls of the cylinder.

I claim:

A piston having a ring groove, adjacent one end, oppositely disposed and intermediately located wrist pin bearings, the wall of the piston having clearance spaces adjacent each wrist pin bearing, said spaces extending to the said ring groove, a circumferential oil groove substantially in the axis of the wrist pin bearing, there being relief ports through the wall of the piston to the interior thereof from the said oil grooves at points midway between the clearance spaces whereby oil may be transmitted from the ring grooves, through the clearance spaces and into the circumferential groove to lubricate the piston skirt and whereby excess oil is discharged within the piston.

In testimony whereof I affix my signature.

ROBERT K. JACK.